UNITED STATES PATENT OFFICE.

MARIE FREDERIC EDOUARD EMMANUEL MAHOUDEAU, OF PARIS, FRANCE.

PROCESS OF EXTRACTING SUGAR FROM MOLASSES.

SPECIFICATION forming part of Letters Patent No. 452,454, dated May 19, 1891.

Application filed August 22, 1890. Serial No. 362,751. (No specimens.) Patented in France October 15, 1889, No. 201,334.

*To all whom it may concern:*

Be it known that I, MARIE FREDERIC EDOUARD EMMANUEL MAHOUDEAU, of Paris, France, have invented certain new and useful Improvements in Processes for Extracting Sugar from Molasses, (for which a patent has been obtained by me in France, dated October 15, 1889, No. 201,334,) of which the following is a specification.

In refining sugar by producing bibasic strontia sucrate at boiling heat, as heretofore practiced, some loss has arisen from the fact that the organic substances present in the sucrate are frequently decomposed and organic strontia salts are formed from which the sucrate is with difficulty freed. These organic salts pass into the waste liquor, and the recovery of the strontia, which would otherwise thus be lost, requires the employment of carbonates of soda or potash and seriously adds to the cost of the refining operation.

It is sought by the present improvement to increase the yield of refined sugar and to avoid the decomposition of the organic substances present in the sucrate, and thus prevent the formation of organic strontia salts in the preliminary steps of the refining operation. These results are accomplished as follows, to wit:

There is first formed a boiling-hot aqueous solution of strontia salt in a suitable boiler or tank. A prescribed quantity of molasses having a temperature of 70° centigrade is then mixed with a quantity of such hot solution sufficient to furnish the required proportion of strontia, and the mixture, having a temperature of about 85° centigrade, is then subjected to continuous agitation for a period of, say, two hours for the purpose of securing the intimate contact of all the molecules of sugar with all the molecules of strontia. Prolonged agitation at a temperature of about 85° centigrade constitutes an important feature of the present process. The required agitation may be effected by energetically stirring the molasses and strontia in a tank provided with a suitable stirrer, or still more effectively by boiling the mixture of molasses and strontia *in vacuo* at a temperature of about 85° centigrade. In the latter case the strong ebullition which ensues effectually secures the desired intimate contact of the molecules of sugar with the molecules of strontia. During these two hours of agitation the resulting magma may be permitted to fall in temperature to, say, 80° or even 75° centigrade. A large proportion of the sugar present immediately combines with the strontia, forming a bibasic sucrate of strontia. Nearly all the remainder of the originally-present free sugar goes into combination as bibasic sucrate during the period of agitation. The cooling of the mass is accompanied by the precipitation of any sucrate which may have been dissolved, so that the mother-liquor at the end of the two hours' agitation will be found to contain but very little sugar. Under these conditions the bisucrate is formed without the decomposition of the organic substances present, and hence without the formation of organic strontia salts, and without either the consequent loss of strontia or the trouble and expense of recovering the strontia from such organic strontia salts. The resulting magma, consisting of the bibasic strontia sucrate and the mother-liquor, is removed from the tank and pumped into filter-presses, in which, after straining off the mother-liquor, the bibasic sucrate is washed in the usual manner.

In the ordinary processes as heretofore practiced the bibasic sucrate after having been washed is subjected to cooling influences, by which its temperature is ultimately brought down to 8° or 10° centigrade, at which temperature it is held for a certain length of time, during which a portion of the strontia present crystallizes. The mass is then removed to a centrifugal machine and drained, and the excess of strontia is thus recovered. The strontia crystals are retained in the centrifugal machine and the sucrate passes through the sieve in the form of a solution. When the process is thus conducted, it is found that under the influence of air (and in presence of a base-like strontia) there is some decomposition of the sugar and formation of acetic or formic acids, which, by combining with the strontia, form soluble salts, which pass into the sirup. This difficulty is avoided in the present process by dissolving the bibasic strontia sucrate in hot water in a close vessel and then quickly cooling the resulting solution by the use of any of the well-known forms of cooling apparatus, or by mixing it with a previously-prepared cold sucrate preparatory to immediate filtration. This sudden cooling is productive of an abundant precipitation of strontia in fine crystals, amounting in quantity to nearly one-half of the strontia employed in the preparation of the bibasic sucrate.

The process of filtration is conducted in a filter-press, in which the crystals of strontia are retained. The liquid flowing from the filter-press will be found to be a solution of monosucrate containing a slight excess of strontia. This solution is then taken to the carbonating apparatus, where the operation of carbonating is quickly performed, but under especially favorable conditions, because of the comparatively low temperature of the solution, which, by this method of operation, has a temperature of 40° to 45° centigrade.

In other respects the various steps of the refining operation and the mode of recovering the strontia employed do not differ from the methods heretofore practiced, and hence do not herein need description in detail.

What is claimed as the invention is—

1. In the strontia process of refining sugar, the herein-described process of producing bibasic sucrate of strontia, which consists in first forming an aqueous solution of strontia at or near the boiling-point and in mixing a prescribed quantity of molasses having a temperature of 70° centigrade with a quantity of such hot solution sufficient to furnish the required proportion of strontia, and in then subjecting the resulting mixture, having a temperature of about 85° centigrade, to agitation for a period of, say, two hours preparatory to the separation of the mother-liquor by filtration from the bibasic sucrate of strontia thus produced.

2. The herein-described method of treating bibasic sucrate of strontia for the immediate recovery of a part of the strontia employed in its preparation, which consists in dissolving said bibasic sucrate in hot water in a close vessel and in then quickly cooling the solution by the use of any suitable refrigerating means, and thereby causing the formation and precipitation of strontia crystals, and in then separately collecting such crystals by draining off the solution therefrom in the usual manner.

MARIE FREDERIC EDOUARD
EMMANUEL MAHOUDEAU.

Witnesses:
 E. GASTOY,
 CEL. ZEYNEL.